(12) United States Patent
Nguyen

(10) Patent No.: US 6,376,831 B1
(45) Date of Patent: Apr. 23, 2002

(54) NEURAL NETWORK SYSTEM FOR ESTIMATING CONDITIONS ON SUBMERGED SURFACES OF SEAWATER VESSELS

(75) Inventor: Thang D. Nguyen, Vienna, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/512,205

(22) Filed: Feb. 24, 2000

(51) Int. Cl.[7] .............................. H01J 5/16; G06F 15/18
(52) U.S. Cl. .................... 250/227.21; 114/312; 701/21; 706/40
(58) Field of Search ...................... 250/227.21, 227.23; 73/800; 114/39.11, 102.1–102.22, 312, 330–333, 338; 701/21; 706/15, 23, 33, 40, 905, 913

(56) References Cited

U.S. PATENT DOCUMENTS

| 5,180,911 | A | | 1/1993 | Grossman et al. | |
|---|---|---|---|---|---|
| 5,845,052 | A | * | 12/1998 | Baba et al. | 395/24 |
| 6,016,763 | A | * | 1/2000 | Takahashi et al. | 114/331 |
| 6,308,649 | B1 | * | 10/2001 | Gedeon | 114/39.11 |

* cited by examiner

*Primary Examiner*—Stephone Allen
(74) *Attorney, Agent, or Firm*—Jacob Shuster

(57) ABSTRACT

An algorithm method of predicting estimated sea energy, wave directions and other seastate data with respect to submerged sea-going vessels, based on inputs derived from signal processed measurements of keel depth, pitch, roll and forward speed applied to three neural networks for heading detection and to a fourth neural network for seastate estimations.

7 Claims, 3 Drawing Sheets

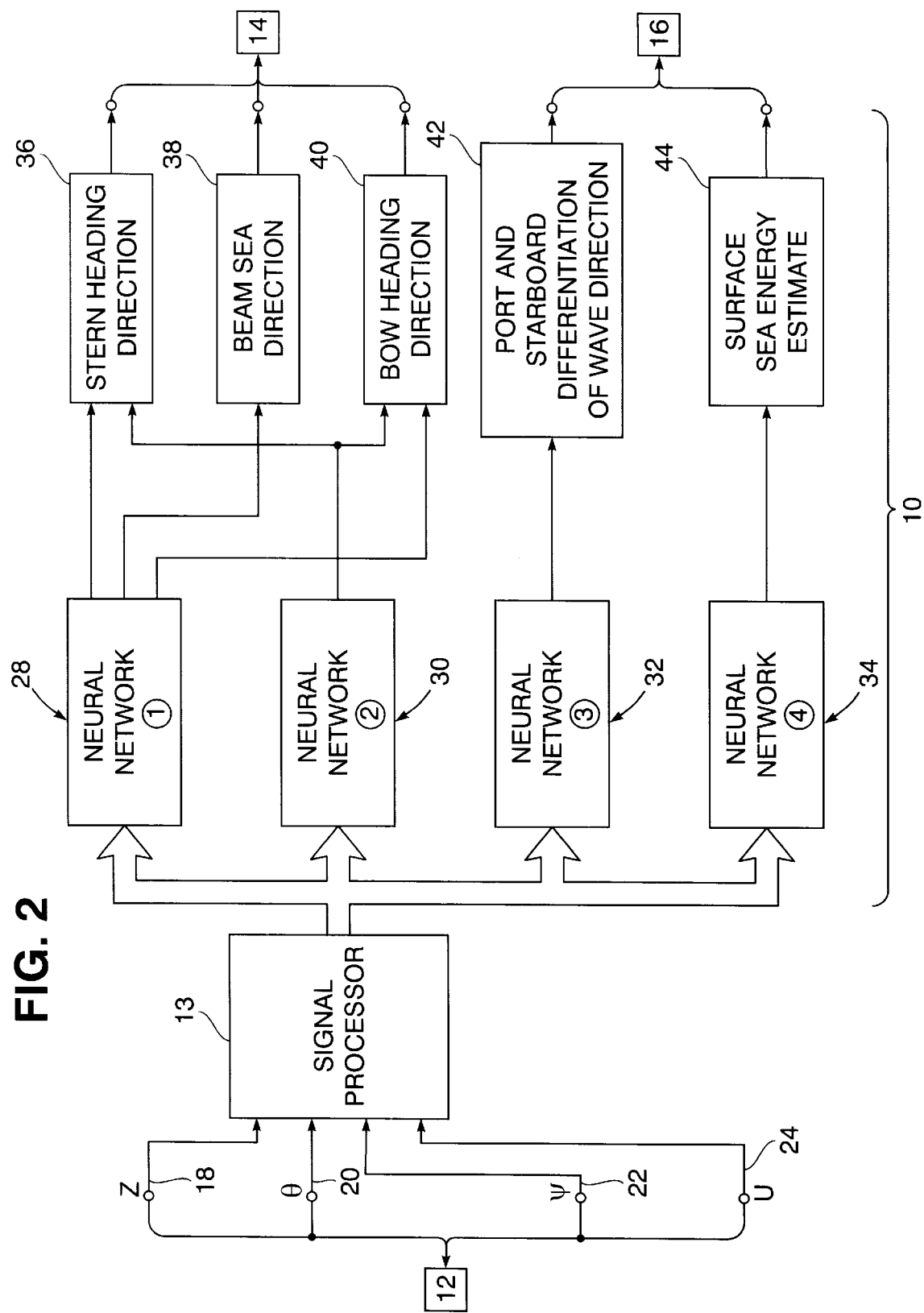

NEURAL NETWORK SYSTEM FOR ESTIMATING CONDITIONS ON SUBMERGED SURFACES OF SEAWATER VESSELS

The present invention relates generally to obtaining data with respect to seaway conditions to which a submerged sea-going vessel is exposed under different operational conditions.

BACKGROUND OF THE INVENTION

The estimation of seaway conditions including seastate, wave direction relative to a submerged sea-going vessel, its heading and the seaway induced suction force on the vessel surfaces, which increases exponentially as the vessel approaches the water surface, is of interest in order to offset the suction force by corrective vessel control so as to maintain keel depth and avoid broach. Attempts have been made to deal with the foregoing problem by development of control methods based on seastate estimation algorithms. However, none of such algorithm estimation methods is sufficiently robust for satisfactory use under actual seastate operation.

The use of a neural network type of signal processing system is generally known in the art as disclosed in U.S. Pat. No. 5,180,911 to Grossman et al. Use of such neural network in the signal processing system as disclosed in the Grossman et al. patent is associated with a complex input signal generating arrangement including optical waveguide, light beam launcher and photodetectors.

It is therefore an important object of the present invention to provide a digital signal processing system having a neural network architecture for seastate estimations based on input signals derived from sea-going vessel measurements so as to predict vessel surface suction force with computational simplicity and operational robustness.

SUMMARY OF THE INVENTION

In accordance with present invention, depth, pitch, roll and forward speed measurements of a sea-going vessel during underwater travel are respectively processed into signal inputs supplied to four neural networks arranged in accordance with an algorithmic architecture involving supply of variable outputs from two of the neural networks to three detectors through which four outputs from two of the neural networks are converted into accurate estimates of stem, beam and bow directional headings of the vessel. The variable output from a third neural network is supplied to a fourth detector through which wave direction relative to the vessel is estimated. The fourth neural network provides one output varied as a linear variable function supplied to a fifth detector for conversion into an estimate of sea energy at the sea surface.

DESCRIPTION OF THE DRAWING FIGURES

A more complete appreciation of the invention and many of its attendant advantages will be readily appreciated as the same becomes better understood by reference to the following detailed description when considered in connection with the accompanying drawing herein:

FIG. 2 is a more detailed block diagram of the signal processing system associated with the system diagramed in FIG. 1;

DETAILED DESCRIPTION OF PREFERRED EMBODIMENT

Figure 1:
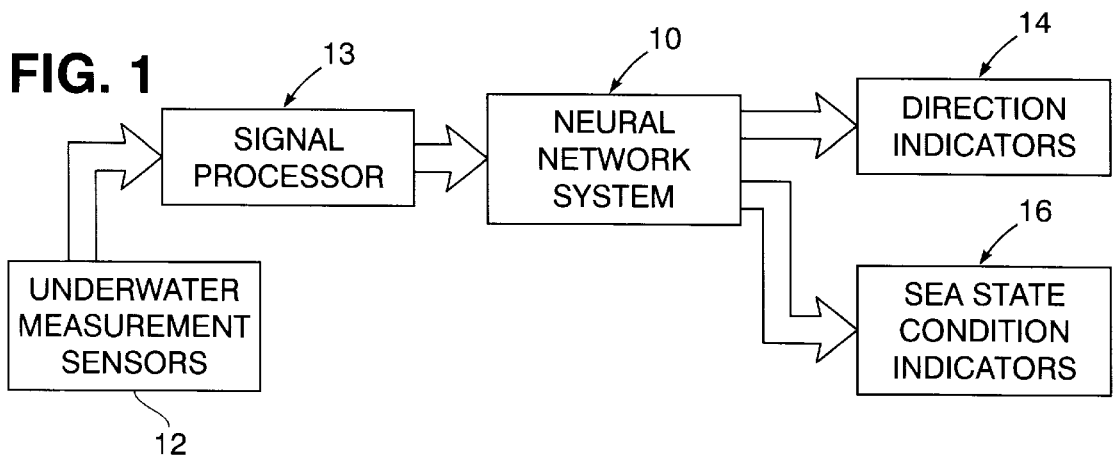
FIG. 1 is a block diagram broadly illustrating a system for estimating sea conditions to which a sea-going vessel is exposed.

Referring now to the drawing in detail, FIG. 1 denotes a neural network type of signal processing system, generally referred to by reference numeral 10, to which a plurality of input signals are fed from a signal processor 13, derived from underwater vessel measurements by means of conventional sensors 12. The signal processing system 10 is thereby operative to produce a first group of outputs through which estimated heading directions are displayed by indicators 14 and a second group of outputs through which estimated seastate conditions are displayed by indicators 16. According to one embodiment, the underwater vessel sensors 12 provide measurements of keel depth (Z), pitch ($\theta$), roll ($\Psi$) and forward speed (U) as inputs to the signal processing system 10. Estimations are thereby displayed by the direction indicators 14 with respect to stem, beam and bow headings of the vessel, while the sea-state indicators 16 display estimates related to seaway direction and sea energy at the vessel surface. From such displayed estimates, suction force on the surface of the sea-going vessel is predicted and corrective heading control may be enabled to mitigate such suction force.

The algorithmic architecture of the neural network system 10 diagramed in FIGS. 1 and 2, processes four (4) inputs derived through the signal processor 13 from the underwater sensor measurements of depth (Z), pitch ($\theta$) and roll ($\Psi$) and forward speed (U). The signal processor 13 detrends the depth, pitch and roll measurements (resulting in zero-mean signals) and passes them through a $4^{th}$-order Butterworth high-pass filter to retain only the first-order component of the wave effects. The signal processor 13 thereby outputs the variances ($Z_{var}$, $\theta_{var}$, $\Psi_{var}$), their products and quotients [$\theta_{var}/Z_{var}$, $\Psi_{var}/Z_{var}$, ($\theta_{var} \cdot Z_{var}$)], the covariances ($\theta \Psi_{cov}$, and $Z\theta_{cov}$), the mean keel depth ($Z_m$), the mean forward speed ($U_m$), and estimated peak frequency of Z ($\omega$). All of such outputs are normalized to be approximately bounded between zero (0) and one (1) for use as inputs to four neural networks 28, 30, 32 and 34 of the system 10 as diagramed in FIG. 2. Inputs to the first neural network 28 consist of $Z_m$, $U_m$, $\omega$, $\theta_{var}/Z_{var}$, and $\Psi_{var}/Z_{var}$. Inputs to the second neural network 30 consist of $\theta_{var}/Z_{var}$, and $\Psi_{var}/Z_{var}$. Inputs to the third neural network 32 consist of $\Psi\theta_{cov}$, and $Z\theta_{cov}$. Inputs to the fourth neural network 34 consist of $Z_m$, $U_m$, $\omega$, $Z_{var}$, $\theta_{var}$, $\Psi_{var}$ and $\theta_{var} \cdot Z_{var}$.

Each of the neural networks 28, 30, 32 and 34 are standardized fully-connected types generally known in the art. The first neural network 28 has five (5) inputs, three (3) neurons, and three (3) outputs. The second neural network 30 has two (2) inputs, two (2) neurons, and one (1) output. The third neural network 32 has two (2) inputs, two (2) neurons, and one (1) output. The fourth neural network 34 has seven (7) inputs, six (6) neurons, and one (1) output.

Outputs from neutral networks 28, 30 and 32 are produced in accordance with logistic sigmoid functions $$\left[ y(x) = \frac{1}{1+e^{-x}} \right]$$

and as a linear output function from neural network 34.

Figure 3:
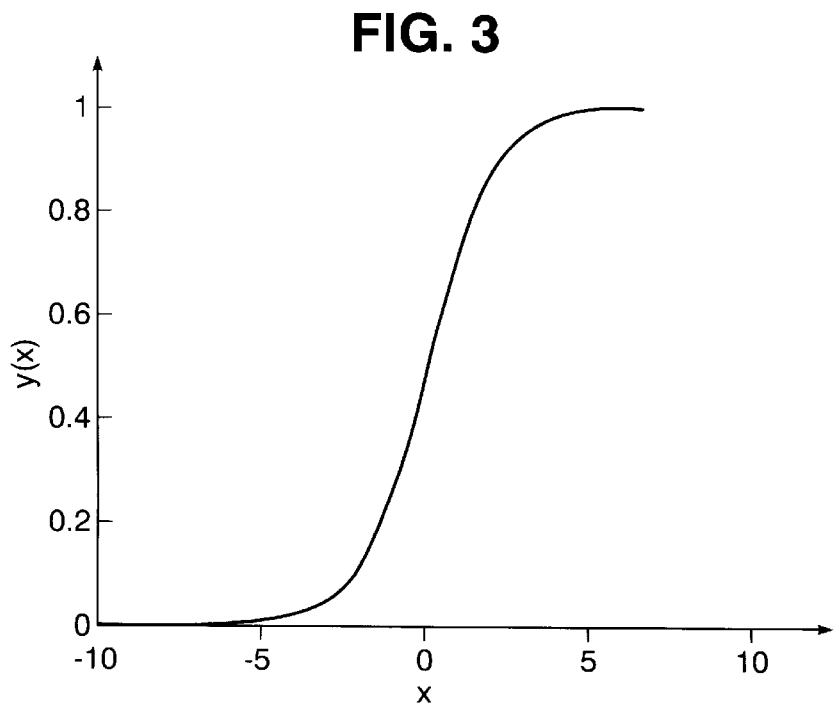
FIG. 3 is a graph depicting a logistic sigmoid function associated with the system depicted in FIG. 2.

Three logsig function outputs based on variables X, Y and Z from the first neural network 28 are respectively fed to stem, beam sea and bow heading direction detector sections 36, 38 and 40 as diagramed in FIG. 2. One logsig function output from the second neural network 30 is also fed to the sections 36 and 40 through which stem and bow heading outputs are displayed by the direction indicators 14. Such logsig function outputs are plotted in FIG. 3 against the variable X which indicates values of practically zero (0) for Y(x), where variable x is less then −5. Y(x) is practically one (1) where x is greater than 5. The three outputs based on variables X, Y and Z from the first network 28 thus respectively follow: (1) the sea waves coming from behind the sea vessel, (2) the beam sea, and (3) the head sea. The second network 30 also associated with detector heading sections 36, 38 and 40 allows sensible estimation of the stem and bow headings.

The third neural network 32 has one logsig function output, which is fed to the detector section 42 to display through the indicators 16 wave directions on the port side of the sea vessel, differentiated from those on the starboard side so as to allow determination of vessel turn direction. The fourth neural network 34 enables estimation of sea energy at the vessel surface through its linear function output applied to detector section 44 for display by the seastate condition indicators 16.

Figure 4:
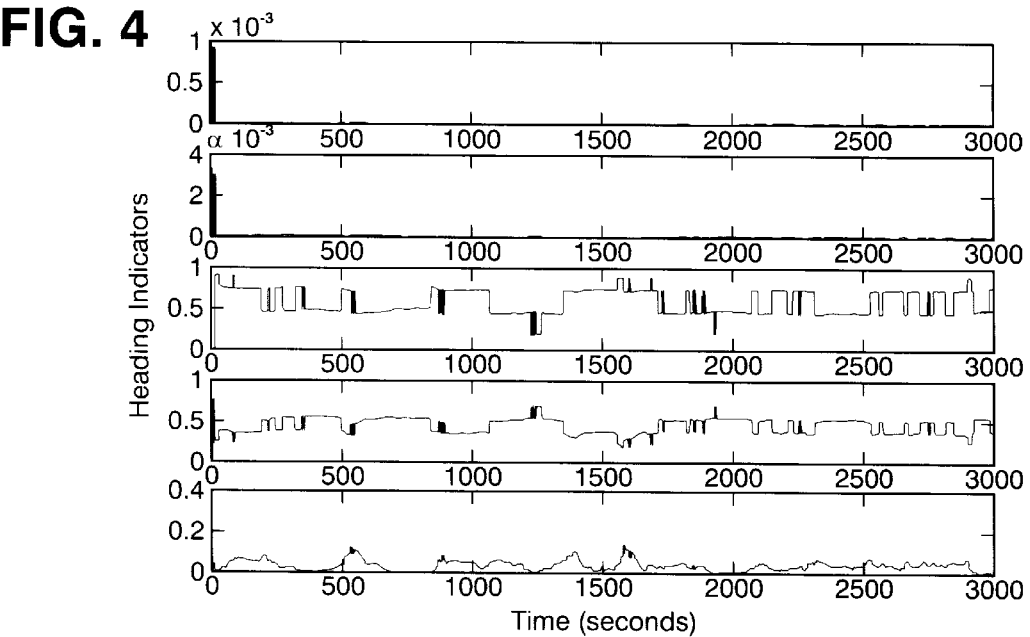
FIGS. 4 and 5 are graphical representations of vessel heading and sea energy conditions on vessel surfaces associated with the seawater estimating system.
Figure 5:
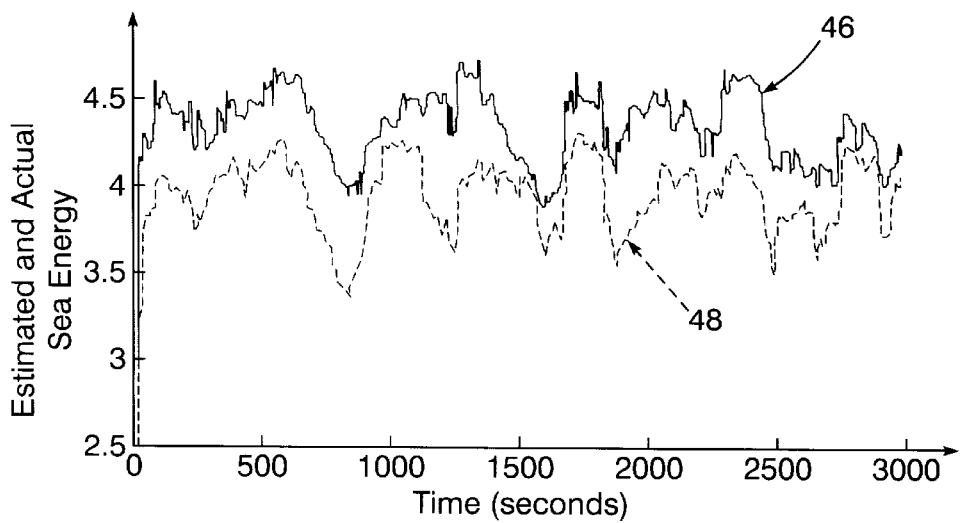

The algorithm of system 10 hereinbefore described with respect to FIG. 2, involves a 150 second sliding window for data, with a 142.5 second overlap for computation of estimates. At start up, the algorithm utilizes a partial window and outputs the estimates 7.5 seconds after activation, while solution updates occur at 7.5 second intervals. Such algorithm of the neural network system 10 was tested with respect to both simulation and experimental data as reflected in FIGS. 4 and 5. FIG. 4 plots the algorithm system outputs indicating heading of a submarine operating under conditions involving a speed of 10 knots, 150 feet keel depth and at seastate and wave direction of 90°. FIG. 5 illustrates a plot 46 of a seastate energy estimate for comparison with the actual seastate plot 48. The estimated sea energy plot 46 converges rapidly and tracks the actual energy plot 48 to establish an average seastate error of 0.4.

In view of the foregoing referred to tested accuracy of the estimates obtained by the data estimating system of the present invention with respect to several classes of U.S. Navy submarines and a limited set of radio-control test models, the results obtained from the estimations may be readily applied with few modifications to different classes of submarines as submerged sea-going vessels.

Obviously, other modifications and variations of the present invention may be possible in light of the foregoing teachings. It is therefore to be understood that within the scope of the appended claims the invention may be practiced otherwise than as specifically described.

What is claimed is:

1. A system for estimating conditions of seawater on a sea-going vessel derived from sensor measurements during underwater travel of the vessel, comprising: applying said measurements to signal processors to provide corresponding signal inputs; supplying said signal inputs to a plurality of neural networks from which outputs are thereby obtained; providing a plurality of detectors to which the outputs of the neural networks are applied; and interconnecting the neural networks through the signal processors and the detectors in accordance with a predetermined algorithmic arrangement to display from the detectors estimates of directional vessel headings and sea conditions associated therewith.

2. The system as defined in claim 1, wherein said sensor measurements consist of: keel depth, pitch, roll and forward speed of the vessel.

3. The system as defied in claim 2, wherein said estimates of the sea conditions relate to wave direction relative to the vessel and sea energy thereon from which to predict induced vessel surface suction force.

4. The system as defined in claim 3, wherein the outputs from a first and second neural network, represented as a logistic sigmoid function of indicator variables, are applied to a first, second and third detector from which estimates of the directional headings are obtained and the output from a third neural network represented by said logistic sigmoid function is applied to a fourth detector from which the wave direction estimates are obtained, while the output of a fourth neural network, represented as a linear function, is applied to a fifth detector from which estimate of sea energy on vessel surface as the sea condition is obtained.

5. The system as defined in claim 1, wherein said estimates of the sea conditions relate to wave direction relative to the vessel and sea energy thereon from which to predict induced vessel surface suction force.

6. The system as defined in claim 5, wherein the outputs from a first and second neural network, represented as a logistic sigmoid function of indicator variables, are applied to a first, second and third detector from which estimates of the directional headings are obtained and the output from a third neural network represented by said logistic sigmoid function is applied to a fourth detector from which the wave direction estimates are obtained, while the output of a fourth neural network, represented as a linear function, is applied to a fifth detector from which estimate of sea energy on vessel surface as the sea condition is obtained.

7. A system for estimating conditions of seawater on a sea-going vessel derived from sensor measurements during underwater travel of the vessel, comprising: signal processing said measurements to provide corresponding signal inputs; supplying said signal inputs to a plurality of neural networks from which outputs are thereby obtained; providing a plurality of detectors to which the outputs of the neural networks are applied; and interconnecting the neural networks with the detectors in accordance with a predetermined algorithmic arrangement to convert said signal inputs into the outputs of the neural networks converted by the detectors into estimates of directional vessel headings and the seawater conditions associated therewith.

\* \* \* \* \*